Figure 5:
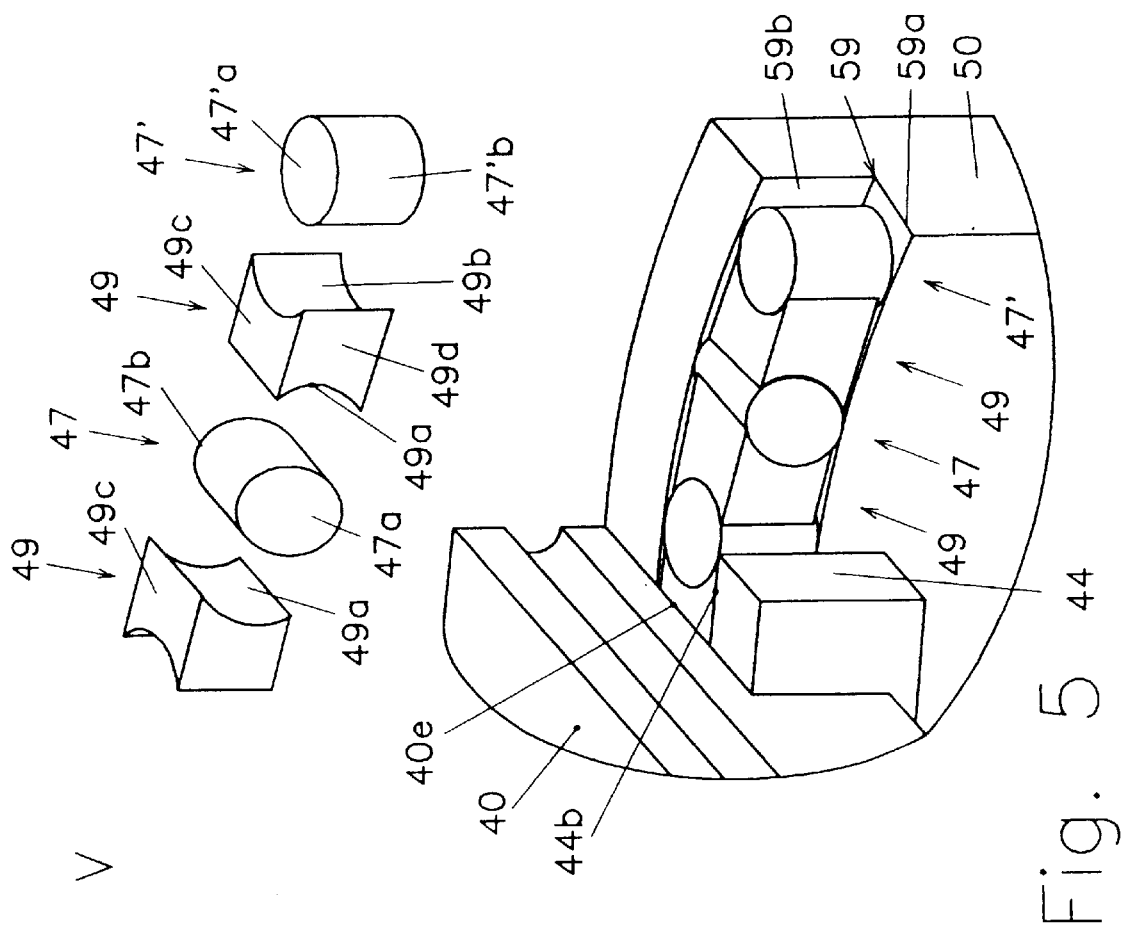

United States Patent
Fecko

[19]
[11] Patent Number: 5,954,609
[45] Date of Patent: Sep. 21, 1999

[54] EPICYCLIC GEAR SYSTEM WITH LINE CONTACT ROLLER BEARINGS

[75] Inventor: Tibor Fecko, Presov, Slovakia

[73] Assignee: Spinea s.r.o., Kosice, Slovakia

[21] Appl. No.: 08/817,801

[22] PCT Filed: Oct. 3, 1996

[86] PCT No.: PCT/IB96/01043

§ 371 Date: Apr. 10, 1997

§ 102(e) Date: Apr. 10, 1997

[87] PCT Pub. No.: WO97/13989

PCT Pub. Date: Apr. 17, 1997

[30] Foreign Application Priority Data

Oct. 6, 1995 [DE] Germany .......................... 195 37 227

[51] Int. Cl.⁶ ..................................................... F16H 1/32
[52] U.S. Cl. ......................... 475/162; 475/168; 475/178; 384/619; 384/622
[58] Field of Search ................................... 475/162, 168, 475/178, 180, 181; 384/615–622

[56] References Cited

U.S. PATENT DOCUMENTS

| | | | |
|---|---|---|---|
| 3,037,400 | 6/1962 | Sundt | 475/178 X |
| 3,275,391 | 9/1966 | Blais | 308/174 |
| 3,492,887 | 2/1970 | Ellinger | 74/640 X |
| 3,517,975 | 6/1970 | Lonngren et al. | 384/619 X |
| 3,814,488 | 6/1974 | Rood | 308/277 |
| 3,861,243 | 1/1975 | Fleischer et al. | 475/178 X |
| 4,338,831 | 7/1982 | Rodaway | 475/178 |
| 4,479,683 | 10/1984 | Kanamaru | 384/619 |
| 4,541,744 | 9/1985 | Ledermann | 384/615 X |
| 4,594,915 | 6/1986 | Braren | 475/178 X |
| 4,853,567 | 8/1989 | Muramatsu et al. | 384/619 X |
| 4,974,972 | 12/1990 | Boosler, Jr. et al. | 384/619 X |
| 5,026,177 | 6/1991 | Masuda | 384/619 |
| 5,140,239 | 8/1992 | Sague | 384/619 X |
| 5,167,590 | 12/1992 | Kratochvil et al. | 475/178 |
| 5,409,316 | 4/1995 | Ferguson | 384/619 X |
| 5,468,193 | 11/1995 | Yamaguchi | 475/162 |

FOREIGN PATENT DOCUMENTS

| | | |
|---|---|---|
| 0594549 | 4/1994 | European Pat. Off. . |
| 2071234 | 9/1971 | France .................................... 384/619 |
| 859699 | 12/1952 | Germany . |
| 1976014 | 10/1967 | Germany . |
| 3725027 | 3/1969 | Germany . |
| 3725027 | 6/1990 | Germany . |
| 969883 | 9/1964 | United Kingdom . |
| 9522017 | 8/1995 | WIPO . |

*Primary Examiner*—Khoi Q. Ta
*Attorney, Agent, or Firm*—Horst M. Kasper

[57] ABSTRACT

The invention relates to a gear system, particularly an epicyclic gear system, with a basic member (40) with at least one rotatably mounted output member (50), and with an annular running space (1), formed in the bearing region of the output member (50), and with bearing surfaces (40e, 44b, 59a, 59b) for cylinder-like roller members (47, 47'). Some roller members (47) are aligned with respect to the axis of rotation (40a) of the gear system substantially axially, while the other roller members (47') are positioned substantially radially (FIG. 1).

18 Claims, 5 Drawing Sheets

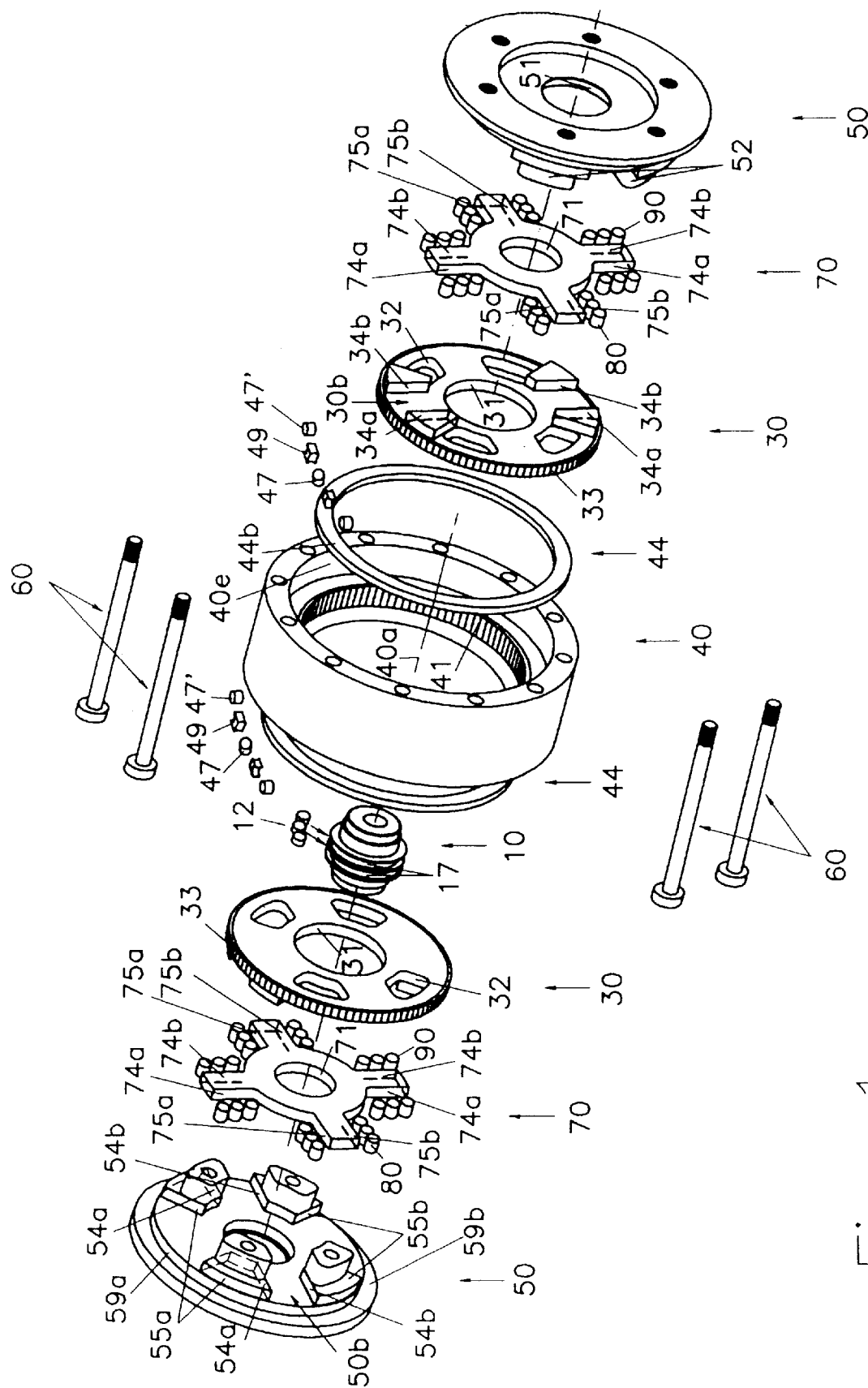

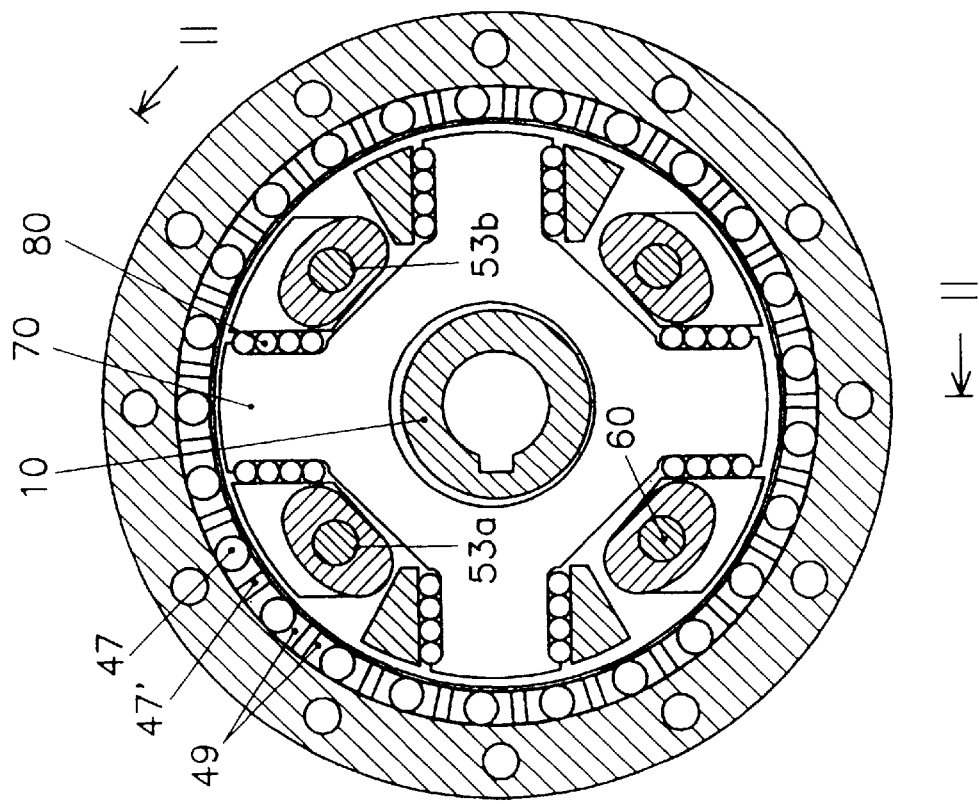
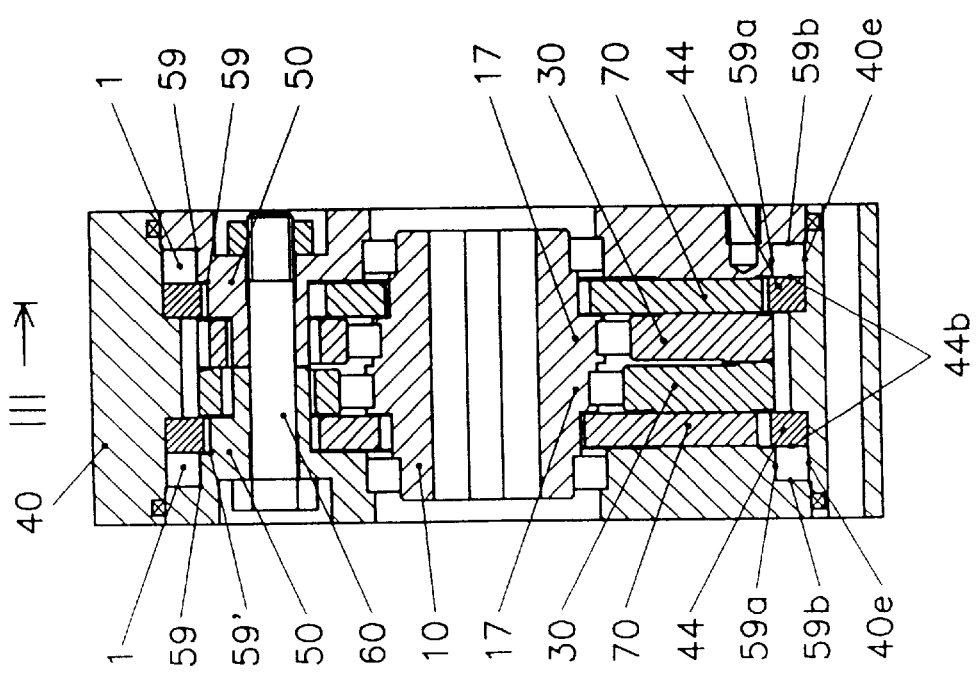
Fig. 3
Fig. 2

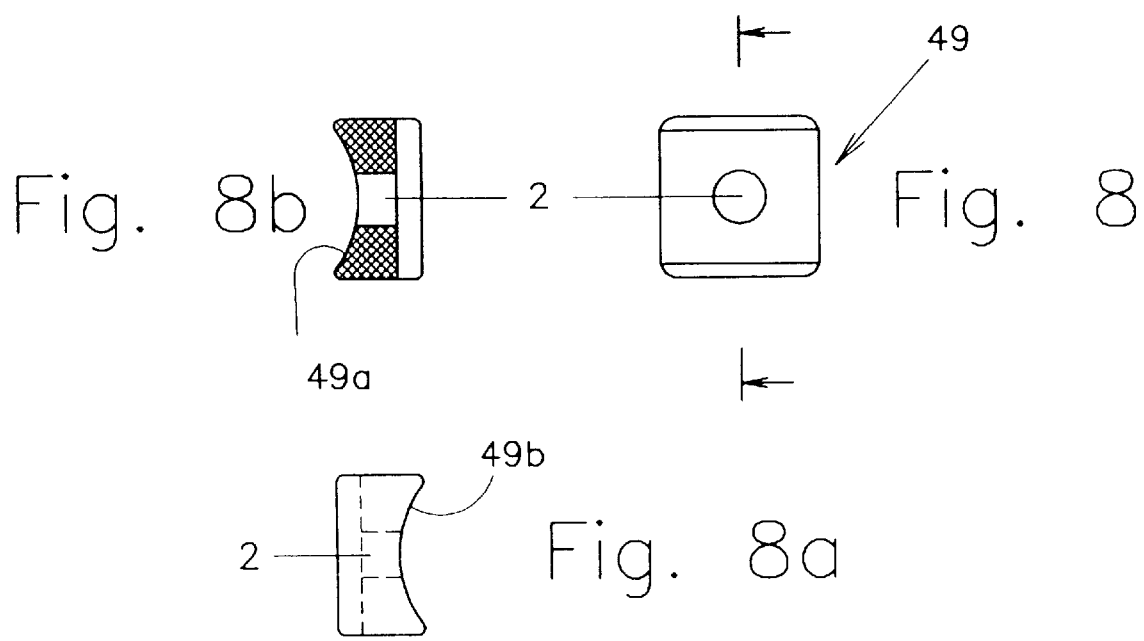

EPICYCLIC GEAR SYSTEM WITH LINE CONTACT ROLLER BEARINGS

The invention relates to a gear system according to the preamble to claim 1.

In conventional gear systems of the type already mentioned, such for example as are described in WO 95/22017, the output members are mounted in the basic member via cylindrical elements. In this case a plurality of running spaces are provided in which there are disposed either radially or axially aligned roller members. The consequence of this is that the gear system has an unacceptable dimension in the axial direction. A further disadvantage involved in the conventional gear system consists in the fact that at least two running spaces, which must be equipped with high-precision bearings, must be present. This renders manufacture of the gear system not only complex but cost-intensive. On the other hand, e.g. in the U.S. Pat. Nos. 1,269,235, 3,275,391, 3,814,488, 4,479,683 or German Patent 859 699 there are disclosed bearings which are suitable for transmitting radial and axial forces, and comprise an outer ring, an inner ring and guide members (cages or partitions) for the cylindrical roller members mounted between the rings. The rings, which are cost-intensively produced with high precision, with defined radial and axial wall thicknesses, still have the disadvantage that they take up space even during their insertion, at the expense of the guided part. A disadvantage of previously-known bearings, finally, is to be seen in the fact that the bearings must be individually adapted to the parts. This relates in particular to the measurements (axial length and radial thickness) of the rings.

Based on the above prior art, the purpose of the invention is to provide assistance here.

The set purpose is fulfilled according to the invention by the features of claim 1.

It is recognised in any case that the invention is fulfilled if there is formed between the basic member and the output member at least one annular hollow cavity, which serves as a running space for roller members, only cylindrical roller members preferably being mounted in this running space, i.e. no additional outer ring, inner ring or cage, some of said roller members being so aligned that they absorb the forces acting in the axial direction of the gear system between the basic member and the output member, while the other roller members are aligned approximately orthogonally to the first-named roller members, and are provided in order to absorb the radial forces acting between the basic member and the output member. It is of particular advantage to provide roller members whose radial cross-section is circular. This cross-section can in this case be constant, yet may continuously increase or decrease also from the centre of the roller member towards both its ends. In the simplest construction of the invention, however, conventional roller members, manufacturable at high precision, are preferably used in the form of cylinders. In such cases a particularly precise mounting of the output member is achieved if the bearing surfaces formed in the output member and basic member are correspondingly machined and designed. This is however already possible with a minimum of technical outlay, especially as it is sufficient if a step is formed respectively in both members, said steps defining in common the necessary running space. Due to the measures proposed a bearing is provided in which the function of the previously-known bearing rings is taken over by the basic member and the output member. The gear is thus a part of the bearing, or the bearing an integral component of the gear. The bearing is not separately identified in relation to the gear, nor is it any longer necessary. The result of this however is that the roller members can be disposed in the outermost radial area of the output member, yet without the necessity to reduce the outer diameter of the disc-shaped output member. These measures are used with advantage in gears with a high transmission ratio.

Further appropriate and advantageous developments of the invention will become apparent from the secondary claims.

Figure 4:
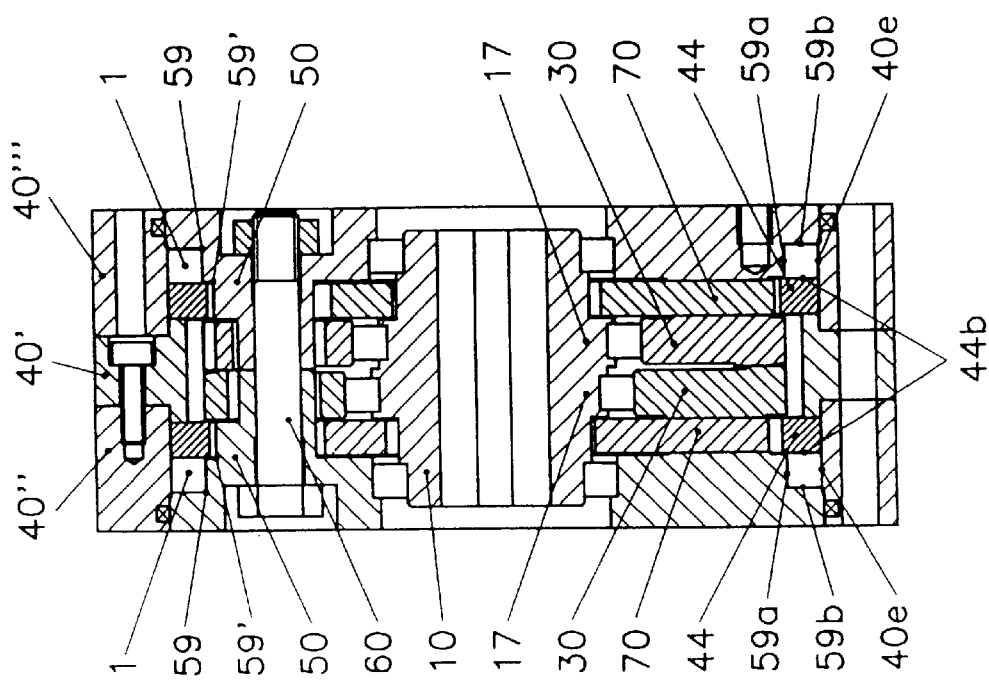
Figure 7:
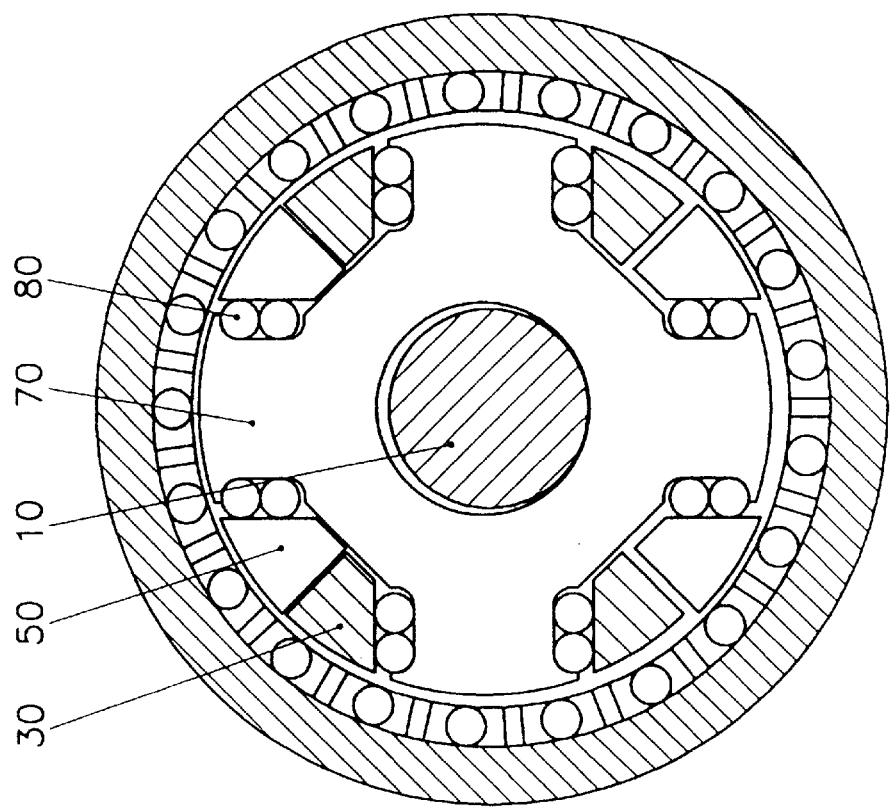
Figure 6:
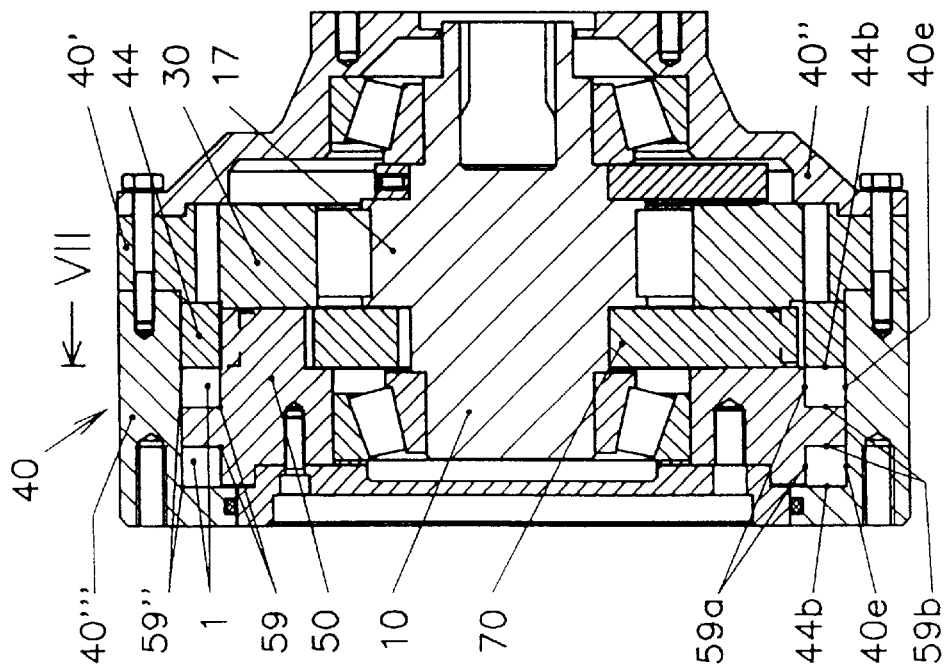

Some embodiments of the invention, given by way of example, are shown diagrammatically in the drawing, and will be explained in more detail in the following. Shown are:

FIG. 1: an exploded view of a gear system;

FIG. 2: The gear system shown in FIG. 1 in the assembled state and in axial cross-section;

FIG. 3: cross-section along line III—III according to FIG. 2;

FIG. 4: an axial cross-section through a further gear system;

FIG. 5: a portion of the bearing shown on a larger scale;

FIG. 6: a cross-section through a gear with a cross;

FIG. 7: a cross-section along line VIII according to FIG. 6, and

FIGS. 8, 8a, 8b positioning member in respective plan view, side elevation and cross-section.

FIGS. 1, 2 and 3 illustrate a gear system. The input shaft 10 with cylinder rollers 12 has two eccentric positions 17, which are rotated through 180°. The portions 17 carry rotatably mounted wheels 30 with external teeth 33 and central openings 31. The wheels 30 have a plurality of continuous axial openings 32, which are distributed uniformly around the axis of the wheels 30. Formed on the circumference of the eccentrics are tracks for cylinders, which serve as bearing members for the wheels 30. The input shaft 10 is connected to the motor shaft of a drive motor by means of a spring not shown in further detail. The motor is connected to a basic member 40 in the form of a wheel with internal teeth 41 by means of a member and screws. The wheels 30 are located in the centre between the output members 50, which are in the form of circular flanges, and which are interconnected by connector members 60. The connector members 60 pass without contact through the openings 32 in wheels 30, so that the flanges 50 may be rigidly connected together. The flange pair 50 is rotatably mounted with respect to the wheel 40 with internal teeth 41. The wheel 40 meshes with the external teeth of wheels 30. The axes of the wheels 30 are located parallel to the axis 40a of the wheel 40, yet off-set by a degree of eccentricity e. The flanges 50 are provided with guide faces/tracks 54a, 54b, which define a linear guide 50b. The guide 50b is oriented transversely to the axis of the flange 50. Each wheel 30 is provided with guide tracks 34a, 34b, which define a linear guide 30b, said linear guide being oriented transversely to the axis of the wheel 30. Located on either side of the gear system, between the flange 50 and the wheel 30, is a transforming member 70. The transforming member 70 has, in two directions orthogonal to one another, tracks 74a, 74b or 75a, 75b in such a way that these tracks are movably disposed in two directions extending vertically to one another. One linear guide is formed on the flange 50, while the member 70 is movably disposed in the other direction in the guide 30b on wheel 30. Both flanges 50 and the member 70 have central openings 51 or 71 respectively. The input shaft 10 is mounted at both ends in the central openings 51 of the flanges 50. The input shaft 10 passes without contact through the opening 71 in member 70. The internal diameter of the opening 71 is in this case twice as large as the external diameter of the input shaft portion which passes through the opening 71. The guide faces 54a and 54b, with which each flange 50 is provided, are formed on the sides lying opposite one another of the stops 55a and 55b. The stops 55a and 55b are in the form of axially-symmetrical pairs, and are located on the end face of the flange. The guide faces 54a and 54b are formed directly at the stops 55a and 55b of the flange 50. They may also be in the form of flat strips which may be secured on the oppositely-lying sides of the stops 55a, 55b. Through the stops 55a, 55b of the flanges 50 there lead axial openings/bores 53a, 53b. The guide tracks with which each wheel 30 is provided are formed on the oppositely-lying ends of the stops 35b. They are formed by central oppositely-lying pairs, which are present on the end face of the wheel 30. The axial openings 32 of the wheel 30 are located on a circle between pairs of stops. The guide tracks 34a, 34b are formed directly on the stops 55a, 55b of the wheel 30. They may also however be in the form of flat strips, which are rigidly formed on the oppositely-lying sides of the stops.

The member 70 is provided with four legs/arms, which are carried by a circular portion. One pair of opposed arms has guide tracks by means of which the member 70 is movably disposed in the linear guide 50b of the flange 50. The second pair of opposed arms likewise has parallel guide tracks by means of which the member 70 is movably disposed in the linear guide 30b of wheel 30. Located between the guide faces 54a and 54b of the linear guide of the flange 50 and the guide faces of the member 70, by means of which the member 70 is movably disposed in the linear guide 50b, are cylindrical roller members 80. Exactly the same situation is realised also with the guide tracks 34a and 34b of the linear guide 30b on wheel 30, and on the tracks of member 70, in which the member 70 is movably disposed. In both cases guidance of the member 70 is ensured by means of roller bearings, when it executes oscillatory movements with respect to the wheel as well as with respect to the flange 50 and the axis 40a. The internal toothing 41 of the wheel 40 comprises cylinders which are mounted in axial grooves. The axial grooves are uniformly distributed on the internal circumference of the wheel 40. These are thus gear wheels whose teeth preferably consist of cylinders. The same also applies to the external teeth 33 of wheel 30, which consist of members with a circular cross-section. The members are likewise mounted in axial grooves. The axial grooves are uniformly distributed on the external circumference of the wheel 30. In the region of contact of the flanges 50 and of the wheel 40, there are formed radial revolving tracks or running spaces, in which the cylinders 47, 47' with positioning members 49 are mounted. The desired degree of initial tension of the bearings in the axial direction can be achieved by axial spacer rings 44.

Further details relative to such a gear system are disclosed in WO 95/22017.

Disposed on the stops 55a and 55b of the flange 50 are spacer members 52. These spacer members 52 pass with a degree of play through the axial openings 32 of wheel 30, and are provided with axial openings. These openings have the connector elements 60 passing through them. By means of tightening the screw nuts, the end faces of the spacer members 52 define the position of both flanges.

The Figures further show that there are formed between the basic member 40 and the output members 50 (flanges) two annular running spaces 1 with bearing surfaces 40e, 44b, 59a and 59b for cylinder-like roller members 47, 47'.

Some of the roller members 47 are aligned approximately axially with respect to the axis of rotation 40a of the gear system, while the other roller members 47' are positioned approximately radially. The running space 1 in the axial cross-section of the gear system is quadrilateral, and in the present embodiment is square. Thus the bearing surfaces 40e, 44b, 59a and 59b form pairs of bearing surfaces 40e, 59a and 44b, 59b. The particular feature of these pairs of bearing surfaces moreover consists in the fact that they define parallel surfaces lying opposed to one another, of which one surface respectively is formed in the basic member 40 or spacer ring 44, while the respective opposed surface is formed in the output member 50. If the spacer ring 44 is not provided, then the bearing surface 44b is formed directly on the basic member 40. The situation is similar with the other bearing surfaces 40e, 59a 59b, which on the one hand can be a part of bearing rings (which are operationally connectable to the basic member 40 or output member 50), and on the other hand can also be part of the basic member 40 or output member 50. The materials for the basic or output member 40, 50 are selected with this in mind. In this case the respectively adjacent bearing surfaces are disposed approximately at right angles to one another. The running spaces 1 are preferably provided in that the output member 50 has in the bearing region a surrounding step 59, whose walls define the bearing surfaces 59a and 59b. Thus the step 59 is off-set to the axis 40a of the gear system and is aligned inwardly or outwardly. Formed in the basic members 40 is a supplementary step 59' for receiving the ring 44. In order to minimise the manufacturing costs of the gear system, the radial bearing surface 44a lying opposite the radially-aligned bearing surface 59b of the output member 50 is a part of the ring 44 located in the gear system. Thus the radial thickness of the ring 44 is selected to be greater than the radial height of the running space. The axial end face of the ring may be particularly simply manufactured in order to ensure the desired properties of a bearing.

It may further be seen from FIGS. 1, 3 and 5 that the axial length of the roller members 47, 47' is smaller than their diameter, and that there is located respectively between two adjacent roller members 47, 47' a respective positioning member 49, which has concave roller surfaces 49a, 49b which are in positively locking contact with the roller members 47, 47'. Thus the axes of the roller surfaces 49a, 49b are aligned parallel to the axes of the associated roller members 47, 47'. The other surfaces 49c, 49d and 49e of the positioning members 49 are in contact with the bearing surfaces 40e, 40', 59a and 59b.

The particular feature of the gear system illustrated in FIG. 4 consists in the fact that the basic member comprises three rings 40', 40" and 40"', which are releasably connectable with one another, the ring 40' being in the form of a wheel with internal teeth 41. In this case the wheel 40' is made of high-quality material, e.g. steel, while the rings 40" and 40"' do not necessarily need to satisfy these requirements. The rings 40" and 40"' with respect to the wheel 40', are not necessarily high-precision parts. It is rather sufficient if their bearing surfaces 40e, which are in contact with the roller members 47, have the necessary precision. As FIG. 5 shows in particular, the roller members 47, 47' and the positioning member 49 form, together with the basic member 40 and the output member 50 a bearing with a running space 1. Thus the positioning members 49 ensure that the roller members 47 and 47' adopt the provided position and retain it, In general the axes of the roller members 47 could form with respect to the axis 40a of the gear system an angle which comes to 5°, 10° or even 30°. The same also applies to the roller members 47' which form with respect to this axis 40a an angle of 85°, 80° or 70°. Particularly good transmission of the forces originating from the output members 50 to the basic member 40 is however achievable if the axes of the roller members 47 and 47' extend parallel or at right angles to the axis 40a.

The constructions according to FIGS. 6 and 7 involve a gear with a cross 70 and two running spaces 1 in which there are mounted axially and radially aligned roller members 47, 47'. The running spaces 1 are however located on only one side of the cross 70; therefore there is in this case only one output member 50. Thus connector members 60 are no longer necessary here. The basic member of the gear comprises a ring 40' a bearing ring 40''' and a closure 40''. Finally, FIGS. 8, 8a and 8b illustrate a positioning member 49 with an opening 2 in which lubricant can be kept for the bearing.

The bearing formed from the roller members 47, 47' and the positioning members 49 may be prefabricated and then inserted into the running space 1. These parts however may also be directly and individually inserted into the running space 1. In the former case the procedure may be such that the roller members and the positioning members are held together by binding agents which can dissolve during the period of use of the gear system. These binding agents may be embedded in the lubricant.

Quite generally, a gear system is involved with a basic member 40 in the form of a wheel with internal teeth 41, with at least one output member 40 rotatably mounted with respect to the wheel, and with an input shaft 10 with at least one eccentric portion 17 upon which there is mounted at least one wheel 30 meshing with the internal teeth 41, and with external teeth 39.

A member 70 respectively transforming the epicyclic movements of the wheel 30 into rotary movements of the output member 50 is in this case disposed between the wheel 30 and the respective output member 50. The output members 50 are disposed at a spacing apart and may be non-rotatably connected together.

The gear system illustrated in FIGS. 6 and 7 has only one transforming member 70 and two output members 50. In order to provide equilibrium for the unbalanced mass of the member 70, a counterweight is provided. Furthermore, the eccentricity is indicated, i.e. the spacing between the axis 30a of the wheel 30 and the axis 40a of the basic member 40.

The invention also relates to a bearing for a gear system of this type, which has cylindrical roller members 47, 47', which are disposed in the running space 1 with bearing surfaces 40e, 44b, 59a and 59b. Thus some of the roller members 47 are formed approximately axially with respect to the axis of rotation 40a of the gear system, while the other roller members 47' are positioned approximately radially.

The advantages attained by the invention can be summarised as follows:

A considerable reduction in the number of separate parts intended to provide a bearing for the output member 50 with respect to the basic member 40, as rings (outer and inner ring) and cages for the roller members 47, 47' are no longer required.

The proposed bearing is independent of the gearing sort of gearing, particularly the type and size.

The bearing can be located in the outermost radial area of the output member 50, i.e. in the area in which the maximum transmission of forces from the basic member 40 to the output member 50 occurs. Thus the interior of the gear can be better utilised.

Processing of the output and/or basic member is simple in terms of production of a running space 1, particularly as these measures are incorporated in the design of a step.

only previously-known, proven parts capable of being mass-produced with high precision, i.e. cylinder-shaped roller members 47, 47' are used, which need not have individual features.

Maximisation of the outer and inner diameters in the output and basic members 50, 40, i.e. also in the toothings 33, 41, so that the torque (M=rxF) can be increased at constant power. Due to this (M=rxF) can be increased at constant power. Due to this fact it is possible to increase the size of other parts of the gear, e.g. the input shaft 10, member 70 etc. Production of the running space 1 is clearly simplified, and its measurement can be carried out continuously as it is manufactured. Previous running spaces, which are inclined with respect to the axis 40 through about 45°, i.e. are in the shape of a double V groove, one V groove being formed on the output member 50, while the other V groove is formed in the basic member 40, do not have such a group of advantages. This results from the fact that a rectangular and axial as well as externally-open step (cf. FIG. 5) in the basic member 40 or in the output member 50 is according to experience more simply, rapidly and precisely produced that a radially open V-shaped groove (incision) in the same members. In addition, in the case of a running space in the form of a double V groove, either the basic member 40 and/or the output member 50 comprise two parts which can be placed together in the direction of the axis 40a, this regularly being effected by screws. A member 40 or 50 assembled from two parts however has quite different properties with respect to the bearing for the roller members 47, 47' (strength, precision, clearance etc.) from a one-piece member according to the invention, which has a direct effect on the essential properties (stability, compactness, etc.) of the gear.

Not least, however, is the fact that in the running space 1 according to the invention the forces are transmitted directly, while in the case of V-shaped grooves (incision) there are always present a plurality of components of force (the resultant is the sum of two force vectors), which is undesirable.

I claim:

1. Epicyclic gear system comprising a basic member (40), with at least one output member (50) rotatably mounted with respect to the basic member (40), and with at least one annular running space (1) formed between the two members (40, 50) for cylinder-like roller members (47, 47') with differently-oriented axes of rotation, some roller members (47) extending substantially parallel to the axis (40a) of the basic member (40), while the other roller members (47') are oriented substantially perpendicularly to the axis (40a), characterised in that the running space (1) is provided with bearing surfaces (40e, 44b, 59a, 59b), and in that the spacing between the mutually-opposed bearing surfaces (40e, 44b, 59a, 59b) roughly corresponds to the diameter of the roller members (47, 47').

2. Gear system according to claim 1, characterised in that the running space (1) is square in the axial cross-section of the gear system.

3. Gear system according to claim 1, characterised in that the respectively opposed bearing surfaces (40e, 44b, 59a, 59b) are disposed at right angles to each other.

4. Gear system according to claim 1, characterised in that at least one of the output member (50) and the basic member (50) have, in the bearing area, a surrounding step (59) whose walls define the bearing surfaces (59a, 59b).

5. Gear system according to claim 4, characterised in that the step (59) is offset towards the axis (40a) of the gear.

6. Gear system according to claim 4, characterised in that a supplementary step (59, 59") with respect to the step (59) is formed in the basic member (40) and/or in the output member (50).

7. Gear system according to claim 4, characterised in that the radial bearing surface (44a) lying opposite the radially-aligned bearing surface (59b) of the output member (50) forms part of a ring (44) disposed in the gear system.

8. Gear system according to claim 7, characterised in that the radial thickness of the ring (44) is greater than the radial height of the running space (1).

9. Gear system according to claim 1 with cylindrical roller members (47, 47'), characterised in that the axial length of the roller members (47, 47') is smaller than their diameter.

10. Gear system according to claim 1, characterised in that a positioning member (49), which preferably has an opening (2) for lubricants, is disposed respectively between two adjacent roller members (47, 47').

11. Gear system according to claim 10, characterised in that the positioning member (49) has concave roller surfaces (49a, 49b) in positive-locking contact with the roller members (47, 47').

12. Gear system according to claim 11, characterised in that the axes of the roller surfaces (49a, 49b) extend parallel to the axes of the associated roller members (47, 47').

13. Gear system according to claim 10, characterised in that the other surfaces (49c, 49d, 49e) of the positioning members (49) are disposed at a spacing from the bearing surfaces (40e, 44b, 59a, 59b).

14. Gear system according to claim 1 with at least one basic member (40) formed as a wheel with internal teeth (41), with at least one output member (50) rotatably mounted with respect to the wheel, and an input shaft (10) with at least one eccentric portion (17) upon which there is rotatably mounted at least one wheel (30) meshing with the internal teeth (41), and having external teeth (39), there being disposed between the wheel (30) and the output member (50) a member (70) transforming the epicyclic movements of the wheel (30) into rotary movements of the output member (50).

15. Gear system according to claim 14 with two output members (50, 50) located at a distance apart, which may be non-rotatably connected together.

16. Bearing for gear system according to claim 1 with cylindrical roller members (47, 47') which are disposed in the running space (1) with bearing surfaces (40e, 44b, 59a, 59b), characterised in that some of the roller members (47) are aligned substantially axially with respect to the axis of rotation (40a) of the gear system, while the other roller members (47') are positioned substantially radially.

17. Bearing according to claim 16, characterised in that a positioning member (49) is respectively disposed between each two adjacent roller members (47, 47').

18. Bearing according to claim 17, characterised in that the positioning member (49) consists of plastics or metal.

* * * * *